US012403346B2

(12) United States Patent
Hofmann et al.

(10) Patent No.: US 12,403,346 B2
(45) Date of Patent: Sep. 2, 2025

(54) METHOD FOR FIGHTING A FIRE EVENT AND SYSTEM FOR CARRYING OUT THE METHOD

(71) Applicant: Minimax Viking Patent Development GmbH, Bad Oldesloe (DE)

(72) Inventors: Klaus Hofmann, Bad Oldesloe (DE); Joachim Böke, Düsseldorf (DE)

(73) Assignee: Minimax Viking Patent Management, Bad Oldesloe (DE)

( * ) Notice: Subject to any disclaimer, the term of this patent is extended or adjusted under 35 U.S.C. 154(b) by 1111 days.

(21) Appl. No.: 17/264,289

(22) PCT Filed: Aug. 2, 2019

(86) PCT No.: PCT/EP2019/070931

§ 371 (c)(1),
(2) Date: Jan. 28, 2021

(87) PCT Pub. No.: WO2020/025812

PCT Pub. Date: Feb. 6, 2020

(65) Prior Publication Data

US 2021/0299499 A1 Sep. 30, 2021

(30) Foreign Application Priority Data

Aug. 3, 2018 (DE) ..................... 10 2018 118 970.2

(51) Int. Cl.
*A62C 37/40* (2006.01)

(52) U.S. Cl.
CPC .................................... *A62C 37/40* (2013.01)

(58) Field of Classification Search
CPC ......... A62C 37/09; A62C 37/36; A62C 37/38; A62C 37/40
See application file for complete search history.

(56) References Cited

U.S. PATENT DOCUMENTS 3,588,893 A 6/1971 McCloskey
3,866,687 A * 2/1975 Banner ................ A62C 35/605 169/65

(Continued)

FOREIGN PATENT DOCUMENTS

CN 108089452 A * 5/2018
DE 42 36 543 A1 5/1994

(Continued)

OTHER PUBLICATIONS

English language translation of CN-108089452-A (Year: 2018).*

(Continued)

*Primary Examiner* — Darren W Gorman
(74) *Attorney, Agent, or Firm* — Perkins Coie LLP

(57) ABSTRACT

The invention relates to a method for fighting a fire event. According to the invention, the following method steps are proposed:

detecting a fire event by a detection device,
starting a first extinguishing phase for fighting the fire event, wherein an extinguishing agent with a first extinguishing effect is discharged during the first extinguishing phase by at least one discharge apparatus,
monitoring the fire event by the detection device and detecting fire event parameters and determining a locality of at least one still existing residual fire source and
starting a second extinguishing phase on the basis of the detected fire event parameters, wherein an extinguishing agent with a second extinguishing effect is discharged, according to need, at least one of the locality or the surroundings thereof during the second extinguishing phase, wherein the second extinguishing effect differs from the first extinguishing effect. The invention further relates to a system for carrying out the method according to the invention and a control device.

20 Claims, 3 Drawing Sheets

(56) References Cited

U.S. PATENT DOCUMENTS

| | | | | |
|---|---|---|---|---|
| 4,821,805 | A * | 4/1989 | Saito | A62C 37/00 169/61 |
| 5,727,634 | A * | 3/1998 | Ishida | A62C 31/05 169/61 |
| 7,066,273 | B2 * | 6/2006 | Tan | A62C 37/40 169/41 |
| 10,363,445 | B2 | 7/2019 | Boeke et al. | |
| 10,363,446 | B2 | 7/2019 | Lenkeit et al. | |
| 10,398,915 | B2 | 9/2019 | Boeke et al. | |
| 10,850,146 | B2 * | 12/2020 | Lee | B05B 3/1035 |
| 2004/0163827 | A1 * | 8/2004 | Privalov | G08B 17/005 239/69 |
| 2009/0315726 | A1 | 12/2009 | Popp et al. | |
| 2012/0160525 | A1 * | 6/2012 | Finn | G08B 13/194 169/5 |
| 2012/0199370 | A1 | 8/2012 | Eckholm et al. | |
| 2016/0051848 | A1 * | 2/2016 | Klarlund | A62C 3/0292 169/61 |
| 2016/0271434 | A1 * | 9/2016 | Dusing | H04L 67/12 |
| 2016/0321900 | A1 * | 11/2016 | Rao | B05B 12/12 |
| 2016/0354626 | A1 * | 12/2016 | McNamara | A62C 35/023 |
| 2017/0259097 | A1 * | 9/2017 | Orglmeister | A62C 31/28 |
| 2018/0161793 | A1 * | 6/2018 | Disimile | B64F 5/23 |
| 2019/0294165 | A1 * | 9/2019 | Hofmann | A62C 3/0221 |
| 2020/0179736 | A1 * | 6/2020 | Verschoor | A62C 35/68 |
| 2021/0069538 | A1 * | 3/2021 | Magnone | A62C 31/24 |

FOREIGN PATENT DOCUMENTS

| | | | |
|---|---|---|---|
| DE | 295 02 831 | U1 | 7/1995 |
| DE | 10 2012 222 017 | A1 | 6/2014 |
| EP | 2896432 | | 7/2015 |
| JP | 2001-46541 | A | 2/2001 |

OTHER PUBLICATIONS

International Searching Authority, Written Opinion of the International Searching Authority with English translation, International Application No. PCT/EP2019/070931, 13 pages (Jan. 2, 2020).

International Search Report, International Application No. PCT/EP2019/070931 (published under WO 2020/025812), 4 pages (Jan. 2, 2020).

* cited by examiner

METHOD FOR FIGHTING A FIRE EVENT AND SYSTEM FOR CARRYING OUT THE METHOD

PRIORITY CLAIM AND INCORPORATION BY REFERENCE

This application is a 35 U.S.C. § 371 application of International Application No. PCT/EP2019/070931, filed Aug. 2, 2019, which claims the benefit of German Application No. 10 2018 118 970.2 filed Aug. 3, 2018, each of which is incorporated by reference in its entirety.

TECHNICAL FIELD

The present invention relates to a method for fighting a fire event. The invention further relates to a system for carrying out this method and a control device for fighting a fire event.

BACKGROUND AND SUMMARY OF THE INVENTION

The prior art has disclosed numerous methods of fire fighting for the protection of machines, installations and facilities, for example depots of waste incineration and recycling plants or of piping systems and/or tank containers for the transport and/or storage of flammable liquids with the risk of pool fire. Automatic extinguishing methods are known which, after fire detection, automatically trigger an extinguishing system such as a deluge system, a water mist extinguishing system, a foam extinguishing system or a gas extinguishing system. In these cases, the amount of extinguishing agent is calculated and made available and the choice and arrangement of the nozzles are selected in such a way that there is a high probability that the fire will be contained or prevented from spreading or even extinguished by the time the fire service arrives.

A high water consumption, inter alia, is considered to be a disadvantage of the known method. Moreover, large quantities of extinguishing agent need to be stored, as the entire amount of extinguishing agent is discharged, as a rule, after the extinguishing system has been triggered or after a subsequent extinguishing. This results in systems with high costs in terms of construction and maintenance. For instance, the extinguishing agent storage tanks require much space. When using large amounts of foaming agent additives, for example on the basis of perfluorinated and polyfluorinated chemicals, in the extinguishing water to generate extinguishing foams, there is also an ecotoxicological risk (persistent and bioaccumulation) and high disposal costs may arise. Finally, there has been no fighting of residual seats of the fire within the scope of fighting the fire, or only to an insufficient extent as, if it was implemented at all, it was implemented manually.

Proceeding from this prior art, it was therefore the object of the invention to overcome the above-described disadvantages to the greatest possible extent. In particular, it was the object of the invention to develop a safe, environmentally friendly and cost-effective solution for quickly and safely fighting a fire event, in which a minimum of extinguishing agent and/or extinguishing agent additives is used.

According to the invention, a method for fighting a fire event is therefore proposed, comprising the steps of:

detecting a fire event by means of a detection device, starting a first extinguishing phase for fighting the fire event, wherein an extinguishing agent with a first extinguishing effect is discharged during the first extinguishing phase by means of at least one discharge apparatus, monitoring the fire event by means of the detection device and detecting fire event parameters and determining a (localization) location of at least one still existing residual fire source, in particular by means of the detection device or a dedicated second detection device and starting a second extinguishing phase on the basis of the detected fire event parameters, wherein an extinguishing agent with a second extinguishing effect is discharged, according to need, at at least one of the locality $P_L$ or the surroundings thereof during the second extinguishing phase, wherein the second extinguishing effect differs from the first extinguishing effect.

Fighting a fire event or fighting a fire is understood to mean, in principle, all measures that are necessary to extinguish, suppress or control a fire that has broken out.

A fire event is understood to mean that a fire breaks out and exhibits a specific fire behavior. The fire usually arises from a singular event and can remain confined to the location. However, if the fire spreads in space, it goes beyond the original place of origin. Often, the fire can be minimized or even extinguished at the original place of origin as a result of successful fire fighting or all the fuel being used up. However, on occasion, one or more residual seats of the fire remain or develop there. A residual fire can exist at the place of origin and/or at another location, or it can develop there. Accordingly, the location of the residual fire may no longer correspond to the location where the fire started. A fire that has been fought and continues as a result of the fire spreading is also referred to as a residual fire below. A residual fire can also have the size and location of the fire before the first extinguishing phase of fighting the fire, if the means of fire fighting in the first extinguishing phase were not successful, and so the second phase becomes necessary. Below, the location of a residual fire is referred to as the locality $P_L$. The location of a residual fire can therefore be very confined to one location or cover a larger area.

In a first method step, a fire event is detected by means of a detection device.

The detection device is preferably configured to detect a fire event.

The detection device preferably comprises one or more sensor devices which can detect fire event parameters. The fire event parameters preferably comprise at least one of fire characteristics, fire progress variables, or localities of residual seats of the fire. Fire progress variables are, for example, the fire intensity, the progress of at least one of the fire intensity over time, the planar or the spatial extent of the fire event and preferably its progress over time. According to the invention, fire characteristics are at least one of electromagnetic radiation, in particular in at least one of the UV or IR wavelength range, thermal radiation, aerosols (in particular smoke aerosols), temperatures, gas concentrations, gas compositions, changes in the concentration of certain gaseous components of fire gases, thermal decomposition products, toxic or flammable gases or others that characterize a fire. The one or more sensor devices are preferably arranged in one or more housings. In a further preferred embodiment, the one or more sensor devices are arranged in fire detectors, such as flame detectors, heat detectors, smoke detectors, gas detectors, multi-sensor detectors or cameras. The detection device is preferably configured to detect the fire event, to monitor the fire event, to detect the fire event parameters and preferably also the locality $P_L$ of the residual fire source. Detecting the locality $P_L$ is preferably understood to mean the determination of the position and the area $A_R$. of the residual fire source. The area can be at least one of a horizontal or vertical area or an area generally angled in space.

In a further configuration of the method according to the invention, the three-dimensional extent of the residual fire source is preferably detected or ascertained as locality $P_L$. This is advantageous, for example, for water mist extinguishing systems or water mist extinguishing apparatuses, since the spatial extent of the extinguishing agent must also be taken into account here when it is discharged on the object to be protected.

After the fire event was detected by means of the detection device, a first extinguishing phase is started in the next method step.

The extinguishing agent of the first extinguishing phase has a first extinguishing effect. The extinguishing agent and the extinguishing properties are preferably selected according to the fire scenario to be expected and the potentially flammable substance.

Monitoring the Fire Event:

The fire event is preferably monitored after the start of the first extinguishing phase, during the first extinguishing phase or after the end of the first extinguishing phase by means of the detection device or a dedicated second detection device. The fire event parameters, in particularat least one of fire characteristics or fire progress variables, are preferably detected by the detection device. In a preferred embodiment of the method, the locality $P_L$ of at least one still existing residual fire source is also determined by means of the detection device.

Preferably, to determine the locality $P_L$ of the at least one still existing fire source, one or more sensor devices of the detection device embodied as imaging sensor/sensors, for example as a CCD or CMOS sensor array or in the infrared (IR) wavelength range as an IR array sensor. In a particularly preferred embodiment, infrared thermopile array sensors are used as IR array sensors. These infrared thermopile array sensors facilitate particularly cost-effective systems. IR array sensors with an n×m matrix, for example with a 4×4, 4×8, 8×8 or 16×8 pixel arrangement, are becoming particularly preferred.

In a preferred embodiment of the method or the system, the detection device comprises at least one of: one or more fire detectors, or one or more imaging sensors.

A second extinguishing phase is started if the detected fire event parameters indicate at least one residual fire source and if at least one of the locality $P_L$ or its surroundings has/have been determined.

What is decisive for the method according to the invention is that an extinguishing agent with a second extinguishing effect is discharged at at least one of the locality $P_L$ or the surroundings thereof during the second extinguishing phase, wherein the second extinguishing effect differs from the first extinguishing effect.

This solution is based on the discovery that, if the size or intensity and location of the residual fire source is known as a result of detecting the fire event parameters and as a result of localization, the residual seat/seats of the fire and the overall fire can be fought most effectively and with minimized amounts of extinguishing agent in comparison with methods from the prior art if the extinguishing agent is discharged, according to need, during the second extinguishing phase and the extinguishing agent is discharged in a manner confined only to at least one of the locality or the surroundings, preferably the immediate surroundings, thereof.

In a preferred configuration of the method, the surroundings are ascertained as a projection of the surrounding volume of the three-dimensional fire event, in this case related to the residual fire source, onto an area and referred to as surroundings $A_U$ below.

Discharging the extinguishing agent on the surroundings $A_U$ as well is advantageous so that the locality is sufficiently impinged with extinguishing agent in order to impinge the edges of the residual fire source and the possibly dynamic further spread thereof with extinguishing agent with great certainty. The surroundings $A_U$ or the preferably immediate surroundings $A_{Umin}$ are preferably calculated by at least one of the detection device or control device, on the basis of the detected fire event parameters.

Thus, the total area on which the extinguishing agent is discharged during the second extinguishing phase can assume the following values: $A_{tot1}=A_R$, $A_{tot2}=A_R+A_U$ or $A_{tot2}=A_R+A_{Umin}$.

It was found to be advantageous for the area $A_{Umin}$ of the immediate surroundings around the fire event to be at least 10% ($A_{Umin}=0.1\ A_R$) and no more than 30% ($A_{Umin}=0.3\ A_R$), preferably 20% ($A_{Umin}=0.2\ A_R$), of the detected area of the residual fire source $A_R$.

Discharging the extinguishing agent over the locality during the second extinguishing phase preferably comprises the discharge over the total area $A_{tot1}$, $A_{tot2}$ or $A_{tot3}$.

In a further configuration of the method according to the invention, the three-dimensional surroundings of the residual fire source are preferably detected or ascertained as surroundings by at least one of the detection device or control device. This is advantageous, for example, for water mist extinguishing systems or water mist extinguishing apparatuses, since the spatial extent of the extinguishing agent must also be taken into account here when it is discharged on the object to be protected.

Selecting the extinguishing agent with a second extinguishing effect, which differs from the first extinguishing effect, during the second extinguishing phase facilitates faster fighting of the fire event in comparison with the methods from the prior art, in particular faster fighting of one or more residual fires, moreover with a reduced amount of extinguishing agent, which is advantageous for reducing the levels of fire damage.

The first and second extinguishing effect are determined by the principal effect of the selected extinguishing agent in conjunction with one or more discharge parameters.

Preferably, the first and second extinguishing effect are determined by the selection of the extinguishing agent, which sets the principal effect, and by the selection of one or more discharge parameters.

In a preferred embodiment of the method, the discharge parameters are selected from the following list:

- volumetric flow rate in l/min,
- mass flow rate in kg/s,
- amount of extinguishing agent introduced in $kg/m^3$,
- amount of extinguishing agent applied in $l/(m^2 \times min)$,
- droplet size or droplet size distribution, in particular of extinguishing water in water mist extinguishing systems
- pressure at the nozzle,
- selection of specific nozzles of a nozzle network (nozzles connected to pipes and preferably opened and closed individually for fluid flow of the extinguishing agent);

Number of Nozzles:

According to the invention, “a number of” is understood to mean one or more parts.

The first and second extinguishing effect are preferably characterized by at least one of their principal effect or their discharge parameters. The principal effect or principal effects is/are preferably selected from the following list, either individually or in combination:

- The principal effect of cooling or removing of heat (e.g., when using extinguishing water and extinguishing water with additives or chemical extinguishing agents such as Novec 1230 (ISO designation FK-5-1-12) in conjunction with one or more discharge parameters from the aforementioned list.
- The principal effect of removing or displacing oxygen, (e.g., extinguishing gases such as, inert gases (e.g., argon, nitrogen) or carbon dioxide or gas mixtures, in conjunction with one or more discharge parameters from the aforementioned list.
- The principal effect of inhibition—rendering inert—of radicals of the combustion reaction by recombination, i.e., disturbing the combustion progression by way of a chain termination reaction, (for example, when using chemical extinguishing agents such as Novec, Halons, or aerosol extinguishing agents based on potassium carbonate) in conjunction with one or more discharge parameters from the aforementioned list.

The at least one discharge apparatus, by means of which the extinguishing agent is discharged, is one from the following list or a combination of a plurality or all of the following:

- a single nozzle;
- a plurality of nozzles;
- a nozzle head/nozzle heads comprising a plurality of fluid outlets;
- a nozzle network (a number of nozzles on pipes for supplying extinguishing agent, which are preferably opened and closed individually for the discharge of the extinguishing agent by means of an associated control member for the extinguishing agent flow);
- a fire monitor for discharging extinguishing agent in the form of at least one of extinguishing water or extinguishing foam or
- a fire monitor in the form of an extinguishing turbine.

Preferably, the discharge apparatus is part of an extinguishing apparatus which preferably also comprises an extinguishing agent supply device.

Preferably, the second extinguishing phase is carried out until the fire has been extinguished. However, alternatively, a further extinguishing phase can be provided in order to continue the fire fighting. This further extinguishing phase can also be referred to as third extinguishing phase.

The method according to the invention is advantageously developed by virtue of the first and second extinguishing phase being started by a control device. The control device is preferably in signal communication with the detection device, which transmits at least one of the detection of the fire event, the fire event parameters or the results of monitoring the fire event, in particular fire event parameters, and preferably the locality $P_L$, to the control device, and the control device further controls the discharge of the extinguishing agent according to need.

The control device is configured to carry out the method according to the invention and comprises program means and data processing means required to this end. By way of example, the control device comprises a microprocessor and, optionally, at least one of a data memory or data transfer means. Furthermore, the control device is preferably configured to receive from the detection device at least one of the detected fire event or the results of monitoring the fire, in particular fire event parameters, and the locality $P_L$, and to process these and/or store these in a data memory. The control device is further configured to generate control signals for discharging the extinguishing agent according to need during the second extinguishing phase. These control signals with the preferably associated timestamps are also preferably stored in the data memory. Preferably, these control signals are transmitted from the control device to the discharge apparatus or the extinguishing apparatus, in particular to the control member or members, in wireless or wired fashion.

Preferably, the control device is configured to control the discharge of the extinguishing agent according to need during the second extinguishing phase on the basis of at least one of evaluation or decision criteria, stored in the data memory, using the detected fire event parameters.

Storing at least one of the detected fire events or the results of monitoring the fire during fire fighting, the locality $P_L$ and the control signals with a timestamp is advantageous in that, following the fire fighting, the progress of the fire and the fight are documented, which is of great value for subsequent analyses, for example for insurers.

In a particularly preferred configuration of the method, the discharge apparatus comprises one or more extinguishing agent outlets, each of which has a respective control member for selective release or blocking of the extinguishing agent flow, and the discharge is implemented by means of this or these extinguishing agent outlet or outlets. Preferably, the selective release and blocking of the extinguishing agent flow is implemented by means of the control device. This is advantageous in that, on the basis of the detected fire event parameters and the locality, only nozzles whose spray pattern covers at least one of the locality of the residual fire source or the residual fire sources, or the preferably immediate surroundings thereof, are opened to discharge the extinguishing agent. This results in a significant reduction in the amount of extinguishing agent.

In a further configuration of the method, the second extinguishing effect, which differs from the first extinguishing effect, is generated by changing one, more or all discharge parameters selected from the following list:

- volumetric flow rate in l/min,
- mass flow rate in kg/s,
- amount of extinguishing agent introduced in $kg/m^3$,
- amount of extinguishing agent applied in $l/(m^2 \times min)$,
- droplet size or droplet size distribution, in particular of extinguishing water
- pressure at the nozzle,
- selection of specific nozzles of a nozzle network (nozzles connected to pipes and preferably opened and closed individually for fluid flow of the extinguishing agent)
- number of nozzles, wherein this change is preferably prompted by the control device.

Preferably, the control device is configured to control the discharge of the extinguishing agent according to need during the second extinguishing phase on the basis of at least one of evaluation or decision criteria, stored in the data memory, using the detected fire event parameters and, in particular, to prompt the change in one or more discharge parameters. Prompting this change of discharge parameters is preferably realized by wireless or wired transmission of corresponding control signals to at least one of the discharge apparatus or the extinguishing apparatus.

Thus, the amount of extinguishing agent applied is increased or reduced during the second extinguishing phase, for example when fighting a fire event with a deluge or mist extinguishing system, for example in steps of 2.5 $l/(m^2 \times min)$ and/or only a certain number of nozzles of the nozzle network are opened by way of the selective driving of the respective control members for the purposes of discharging the extinguishing agent, and the remaining nozzles are closed.

In a special further configuration of the method, the discharge apparatus of the first extinguishing phase is embodied as a first number of nozzles of a spray water extinguishing system or a water mist extinguishing system and extinguishing water is preferably discharged as extinguishing agent. In the second extinguishing phase, the control device controls the discharge of extinguishing water as extinguishing agent with a second extinguishing effect by means of a second number of nozzles of the spray water extinguishing system or the water mist extinguishing system. Spray water extinguishing systems are also understood to include those in which a control organ is advantageously assigned to each nozzle for the purposes of selective opening and closing.

Advantages of using extinguishing water during the first extinguishing phase include water being particularly cheap, non-toxic, PH neutral, non-corrosive, present to sufficient extent and simple to convey or store.

As an alternative to the abovementioned embodiment, the discharge apparatus of the first extinguishing phase is embodied as a first fire monitor in a further preferred embodiment of the method and extinguishing agent with a first extinguishing effect, for example extinguishing water, is discharged and the control device controls the discharge of extinguishing agent, for example extinguishing water with a second extinguishing effect, for instance as a result of modification of one or discharge parameters, using at least one of the first fire monitor or a further fire monitor during the second extinguishing phase. Preferably, an extinguishing turbine is used as a fire monitor, for example if the extinguishing effect of a small droplet size over great distances of 50 m or more, accompanying this, is required.

In a further preferred embodiment of the method, at least one of the nozzles of the second number of nozzles, or the first or the further fire monitor, is aligned with at least one of the locality $P_L$ or the surroundings thereof.

In a preferred development of the method, the control device, on the basis of the detection of the locality $P_L$, transmits an alignment signal $I_D$ to the first or the further fire monitor for alignment with at least one of the locality $P_L$ or the surroundings thereof.

In a further preferred embodiment of the method, extinguishing water is discharged during the first extinguishing phase and an extinguishing agent additive, preferably a foaming agent, is only mixed into the extinguishing water during the second extinguishing phase. Preferably, extinguishing water as extinguishing agent is discharged from a first number of nozzles during the first extinguishing phase and extinguishing agent is discharged from a second number of nozzles during the second extinguishing phase, wherein an extinguishing agent additive, for example a foaming agent, is mixed into the extinguishing water in a subset of the second number of nozzles while extinguishing water is discharged as extinguishing agent from the remaining nozzles of the second number of nozzles.

This has a significant advantage that the amounts of foaming agent additives, for example on the basis of perfluorinated and polyfluorinated chemicals, can be significantly reduced in comparison with methods in which foaming agents are also used for extinguishing purposes during the first extinguishing phase. This significantly reduces the ecotoxicological risk.

In a further preferred configuration of the method, an extinguishing agent additive, preferably a foaming agent, is selectively supplied to the extinguishing water only in front of the nozzle or nozzles which are aligned with at least one of the locality $P_L$ or the surroundings thereof. This is implemented for the purposes of effective, quick extinguishing of the residual fire source or the residual seats of the fire and minimizing the used extinguishing agent additives, in particular foaming agents.

Preferably other extinguishing agent additives, such as foaming agent concentrates, wetting agents, gel formers, retardants or salts, can also be added to the extinguishing water.

In a further preferred configuration of the method, the detection device is configured to detect the fire event, to monitor the fire event, to detect the fire event parameters and to locate the locality $P_L$ of the residual fire source.

In a particularly preferred development of the method, the locality $P_L$ of at least one of: the at least one still existing residual fire source or the surroundings thereof, are determined using an IR array sensor, in particularan infrared thermopile array sensor. This is advantageous in that at least one of temperature data or temperature distribution data, of the residual fire source or sources, are also detected in addition to the detection of the localization data, and this is also carried out before and during the second extinguishing phase. These temperature data are preferably transmitted to the control device. Further, these temperature data are preferably used by the control device in order to generate an extinguishing stop control signal for terminating the second extinguishing phase once the detected temperatures drop below specified limits.

In a further configuration of the method, the detection device transfers the results of monitoring the fire event on the basis of the detected fire event parameters to the control device. Further, on the basis thereof, the control device generates the control signal $I_{T2}$ for the start of the second extinguishing phase, in particular for the discharge of the extinguishing agent according to need.

Accordingly, the following method steps are carried out in this embodiment:

transferring the results of monitoring the fire event on the basis of the detected fire event parameters from the detection device to the control device, and generating a control signal $I_{T2}$ for the start of the second extinguishing phase, in particular for the discharge of the extinguishing agent according to need, by means of the control device on the basis of the received results of monitoring the fire event on the basis of the detected fire event parameters.

The control device is preferably configured to receive the results of monitoring the fire event on the basis of the detected fire event parameters from the detection device and, preferably, to generate, on the basis thereof, a control signal $I_{T2}$ for the start of the second extinguishing phase, in particular for the discharge of the extinguishing agent according to need.

The invention was described above in a first aspect with reference to the method according to the invention. However, the invention further also relates to a system for fighting a fire event, preferably for carrying out the method according to the invention.

The system for fighting a fire event comprises at least one detection device and one discharge apparatus, wherein the system is configured to carry out the method according to the invention in all described embodiments.

The system is advantageously developed by virtue of comprising a control device, wherein the control device is configured to perform the method according to the invention, in particular to receive and process: at least one of fire events detected by the detection device or the results of monitoring the fire, in particular fire event parameters, and the locality $P_L$ of at least one residual fire source; and, preferably, to store these in the data memory, and on the basis thereof, to generate the control signal $I_{T2}$ for the discharge of the extinguishing agent according to need during a second extinguishing phase.

In a further advantageous configuration of the system, the control device is configured to prompt the change in one, more or all discharge parameters, in particular prior to the start of the second extinguishing phase, said discharge parameters being selected from the following list:

volumetric flow rate in I/min, mass flow rate in kg/s, amount of extinguishing agent introduced in $kg/m^3$, amount of extinguishing agent applied in $l/(m^2 \times min)$, droplet size or droplet size distribution, in particular of extinguishing water pressure at the nozzle, selection of specific nozzles of a nozzle network (nozzles connected to pipes and preferably opened and closed individually for fluid flow of the extinguishing agent)

number of nozzles.

In a particularly preferred embodiment of the system, the latter comprises an unmanned vehicle, in particulara robot or a drone, which preferably comprises the detection device or one of the detection devices for detecting a fire event and/or is configured to discharge extinguishing water and also or alternatively an additional extinguishing agent, in particular during the second extinguishing phase.

In particular, the system according to the invention is consequently configured to carry out mixing of an extinguishing agent additive into an extinguishing agent of the first phase according to need, such as, e.g., a foaming agent.

In particular, the method according to the invention is consequently moreover configured to carry out an increase or reduction in the volumetric flow rate, mass flow rate, amount of extinguishing agent discharged or droplet size from the first extinguishing phase, with or without an extinguishing agent additive.

In particular, the system according to the invention is consequently further configured to perform or carry out an activation of adjacent nozzles or a different number or different selection of nozzles of a nozzle network on the basis of at least one of the spread of the fire or the development of the fire.

In a further aspect, the invention relates to a control device for fighting a fire event. The control device comprises programming means and data processing means for performing the method according to the invention, preferably comprising a microprocessor, optionally comprising a data memory, wherein the control device is particularly set up to generate control signals for starting a first and a second extinguishing phase, to receive and process at least one of fire events detected by a detection device or the results of monitoring the fire, in particular fire event parameters, and the locality $P_L$ of at least one residual fire source; and preferably to store these in the data memory, to generate control signals for discharging the extinguishing agent according to need during the second extinguishing phase, to control the discharge of the extinguishing agent according to need during the second extinguishing phase on the basis of at least one of evaluation or decision criteria stored in the data memory using the detected fire event parameters.

The control device is preferably configured to generate an alignment signal $I_D$ and transmit the latter to a fire monitor for alignment with the locality $P_L$.

The control device is preferably configured to prompt the change in one, more or all discharge parameters, in particular prior to the start of the second extinguishing phase, said discharge parameters being selected from the following list:

volumetric flow rate in l/min, mass flow rate in kg/s, amount of extinguishing agent introduced in $kg/m^3$, amount of extinguishing agent applied in $l/(m^2 \times min)$, droplet size or droplet size distribution, in particular of extinguishing water pressure at the nozzle, selection of specific nozzles of a nozzle network (nozzles connected to pipes and preferably opened and closed individually for fluid flow of the extinguishing agent)

number of nozzles.

In a particularly preferred configurations of at least one of the method, the system, or the control device, the control device comprises a fire detection and/or extinguishing control panel.

This is advantageous in that computer power and data memory of the fire detection and/or extinguishing control panels used in automated extinguishing systems can be used for the additional functions of data acquisition of the monitoring of the fire event and of the data for determining the locality $P_L$ and of generating control signals for discharging extinguishing agent according to need, and no additional control device is required. This is particularly cost-effective.

BRIEF DESCRIPTION OF THE DRAWINGS

Further advantages and advantageous configurations of the invention are described in more detail below with reference to the attached figures, with the same reference signs being used for the same or similar components or assemblies.

MODE(S) FOR CARRYING OUT THE INVENTION

Figure 1:
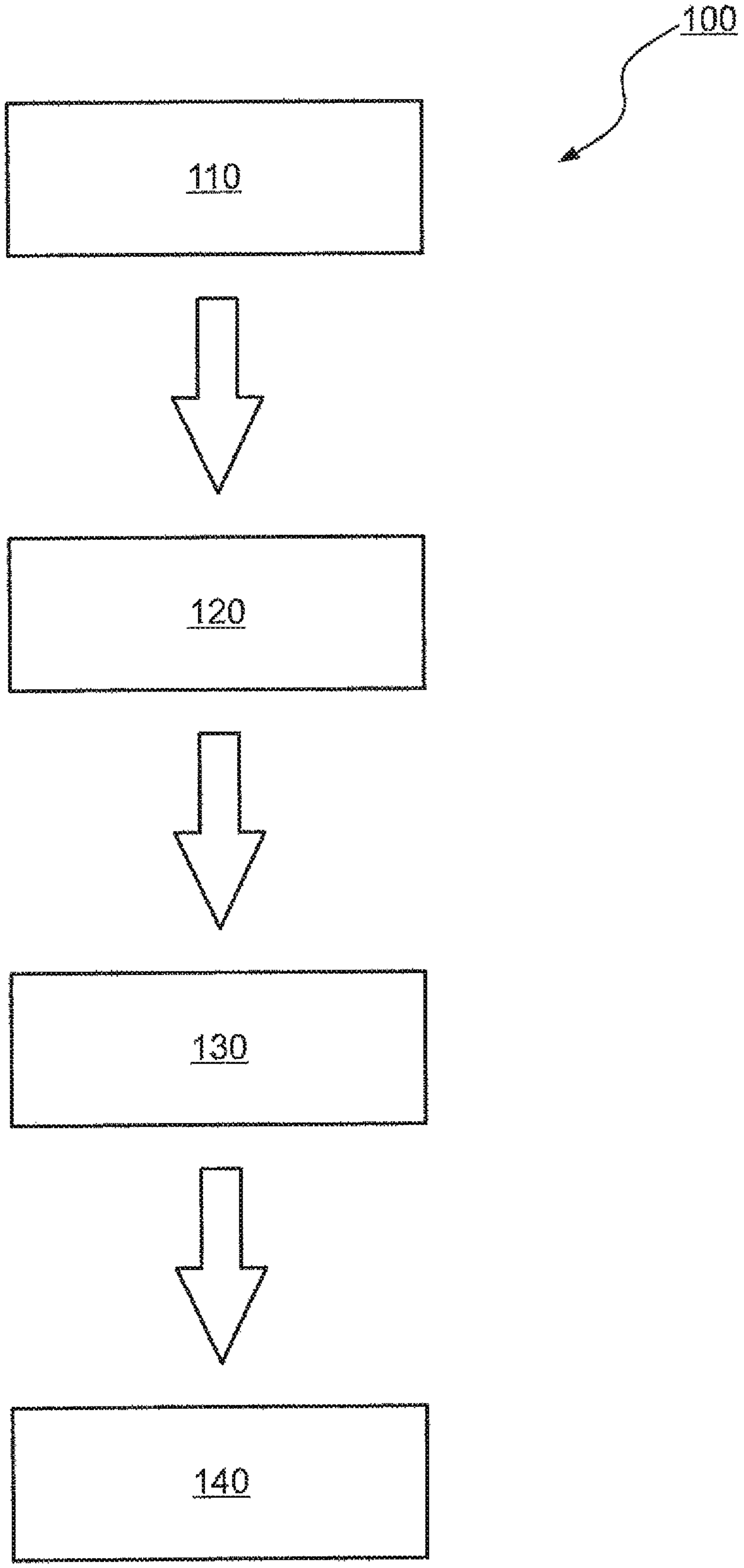
FIG. 1 shows a sequence of the method according to the invention in schematic and exemplary fashion.

FIG. 1 illustrates the schematic sequence of the method according to the invention for fighting a fire event according to a preferred exemplary embodiment. Initially, a fire event 200 is detected in method step 110 by means of a detection device 210.

By way of example, this exemplary embodiment relates to a pool fire in a spill containment of a container for flammable liquids.

A pool fire should be understood to mean all fire events in which a liquid in the form of an accumulation, i.e., a pool, is on fire.

To fight a fire event 200 (FIG. 2), the fire event 200 is detected by means of a detection device (210, cf. FIG. 2) in a first step 110.

After detection, a first extinguishing phase is started, during which the fire event 200 is fought, wherein an extinguishing agent, which is preferably extinguishing water or optionally extinguishing water with a foam additive or the like, i.e., in general, an extinguishing agent with a first extinguishing effect, is discharged during the first extinguishing phase by means of at least one discharge apparatus 310.

Figure 2:
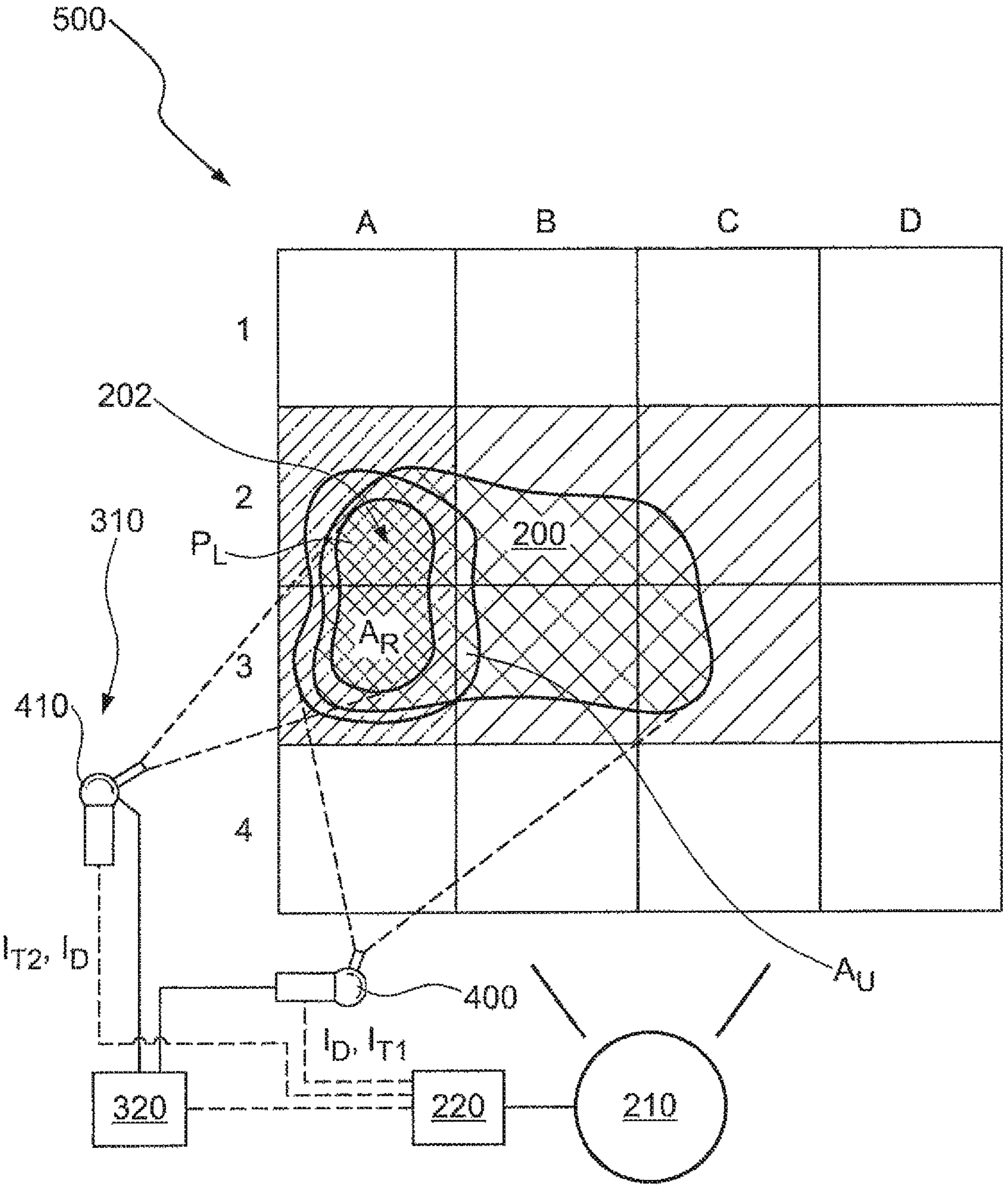
FIG. 2 shows a schematic view of a system for performing the method as per FIG. 1 in a first exemplary embodiment.

To be able to assess the success of the course of the first extinguishing phase, the fire event is monitored, fire event parameters are detected and a locality $P_L$ of at least one residual fire source is determined in a further method step 130, in particular by means of the detection devices, cf. FIG. 2; if no locality can be determined, this already allows the conclusion to be drawn that the fire source was already completely extinguished during the first extinguishing phase. However, for the purposes of explaining the method according to the invention further, the assumption is made that there still is a residual fire source 202 (cf. FIG. 2), or said residual fire source has arisen, following the first extinguishing phase.

Thereupon, a second extinguishing phase is started in a next method step 140 on the basis of the fire event parameters detected in step 130, wherein an extinguishing agent with a second extinguishing property is discharged, according to need, at at least one of the determined locality $P_L$ or the surroundings thereof during the second extinguishing phase, wherein the second extinguishing effect differs from the first extinguishing effect.

Preferably, extinguishing agent with the second extinguishing effect is discharged both at the locality $P_L$ and at the surroundings thereof. The size of the area in the surroundings of the locality $P_L$ is preferably dimensioned according to one of the preferred embodiments described above. Here, discharge according to need is understood to mean that the amount of extinguishing agent, the spatial or planar distribution of the extinguishing agent and the adapting of the second extinguishing effect are preferably implemented on the basis of the detected fire event parameters.

FIG. 2 shows a system for fighting a fire event, which is configured to perform the method as per FIG. 1. In this respect, reference is made to the description of the method of FIG. 1 and in the described preferred embodiments further above.

The system 500 comprises at least one first detection device 210 and preferably one or more further detection devices (not illustrated). The detection device 210 is configured to detect a fire event 200. If use is made of only one detection device 210, the latter is preferably further configured to monitor the fire event 200, to detect the fire event parameters thereof and to locate a locality $P_L$ of a residual fire source 202.

The detection device 210 preferably comprises an infrared array sensor, which comprises 4×4 sensor cells. As a result, it is possible to divide the monitored space into a total of four columns A, B, C, D and four rows 1, 2, 3, 4 in the system 500 and to monitor the entirety thereof.

The detection device 210 is in signal communication with an electronic control device 220.

Further, the system 500 comprises an extinguishing agent discharge apparatus 310. In the shown exemplary embodiment, the discharge apparatus 310 comprises a first fire monitor 400 and a further fire monitor 410. The fire monitors 400, 410 are alignable at angles with different sectors A1 . . . . D4.

The first fire monitor 400 is configured to discharge extinguishing agent with a first extinguishing effect while the second fire monitor 410 is configured to discharge extinguishing agent with a second extinguishing effect that differs from the first extinguishing effect. By way of example, the first fire monitor is configured to discharge extinguishing agent in the form of water with a first aperture cone while the second fire monitor 410 is configured to discharge water with a foam additive and, optionally, a second aperture cone.

The area A1 . . . . D4 shown in FIG. 2 is, for example, the surface area of a spill containment, which captures leakages from a container with flammable fluid, for example ketones, liquid gas, alcohols and others. The assumption should be made in the present exemplary embodiment that a fire event 200 took place at a certain time in sectors A2, B2, C2, A3, B3, C3; this is also referred to as a pool fire of the collected flammable liquid. The fire event 200 is detected by means of the detection device 210 and a first extinguishing phase for fighting the fire event 200 is started by virtue of the first fire monitor 400 discharging extinguishing agents into sectors A2, B2, C2, A3, B3, C3.

By way of example, the extinguishing agent is provided for the first fire monitor 400 from an extinguishing agent supply device 320, which is part of the system 500. As a consequence of fire fighting, the fire event 200 is reduced to a residual fire source 202, which is only still situated in sectors A2 and A3 of the spill containment. The fire event and the course of fighting the latter is monitored by means of the detection device 210. In the process, fire event parameters are detected, as is the locality $P_L$ of the residual fire source 202. The locality $P_L$ is characterized by the arrangement and size of an area $A_R$ of the residual fire source.

Once the fire event parameters and $P_L$ have been detected, a second extinguishing phase is started, within the scope of which extinguishing agent is discharged at the residual fire source 202 from the second fire monitor 410. In the process, it is possible to discharge extinguishing agent only at the sectors A2, A3, within which the area $A_R$ of the locality $P_L$ extends. As an alternative or in addition thereto, however, it is also possible to supply the immediate surroundings around the residual fire source 202 with extinguishing agent from the second fire monitor 410. As a result of which, for example, sectors B2, B3 can additionally be supplied with extinguishing agent; see an indicated outline of the surroundings with the area $A_U$.

The fire monitors 400, 410 and the extinguishing agent supply device 320 are preferably in signal communication with the control device 220 in each case. If necessary, the fire monitors 400, 410 are aligned with the fire event 200 or the locality $P_L$ of the residual fire source 202 by way of transferring an alignment signal $I_D$ from the control device 220 to the fire monitors 400, 410. The alignment signal $I_D$ depends on the detection of the fire event parameters and, in particular, on the determination of the locality $P_L$. Preferably, the control device 220 further adapts at least the second extinguishing effect of the second fire monitor 410, for example by virtue of mixing a suitable amount of foaming agent into the extinguishing agent, which is supplied by the extinguishing agent supply device 320, on the basis of the ascertained fire event parameters.

Since the exemplary embodiment as per FIG. 2 is a pool fire in exemplary fashion, reference is made to the following:

In the explanations given, the assumption was made that the pool of the collected flammable material only extended in the shown sectors A2-C3. If the fire event occurs in a collection container like the one indicated in FIG. 2, the fire very quickly extends over the entire frontage of the flammable liquid. Thus, if the collection container is wetted over its entire surface area, all sectors A1 to D4 would be on fire by the time the first fire monitor 400 is effective. However, irrespective thereof, the procedure of fighting the fire is implemented according to the method as per FIG. 1 and in a manner analogous to the details explained above.

Figure 3:
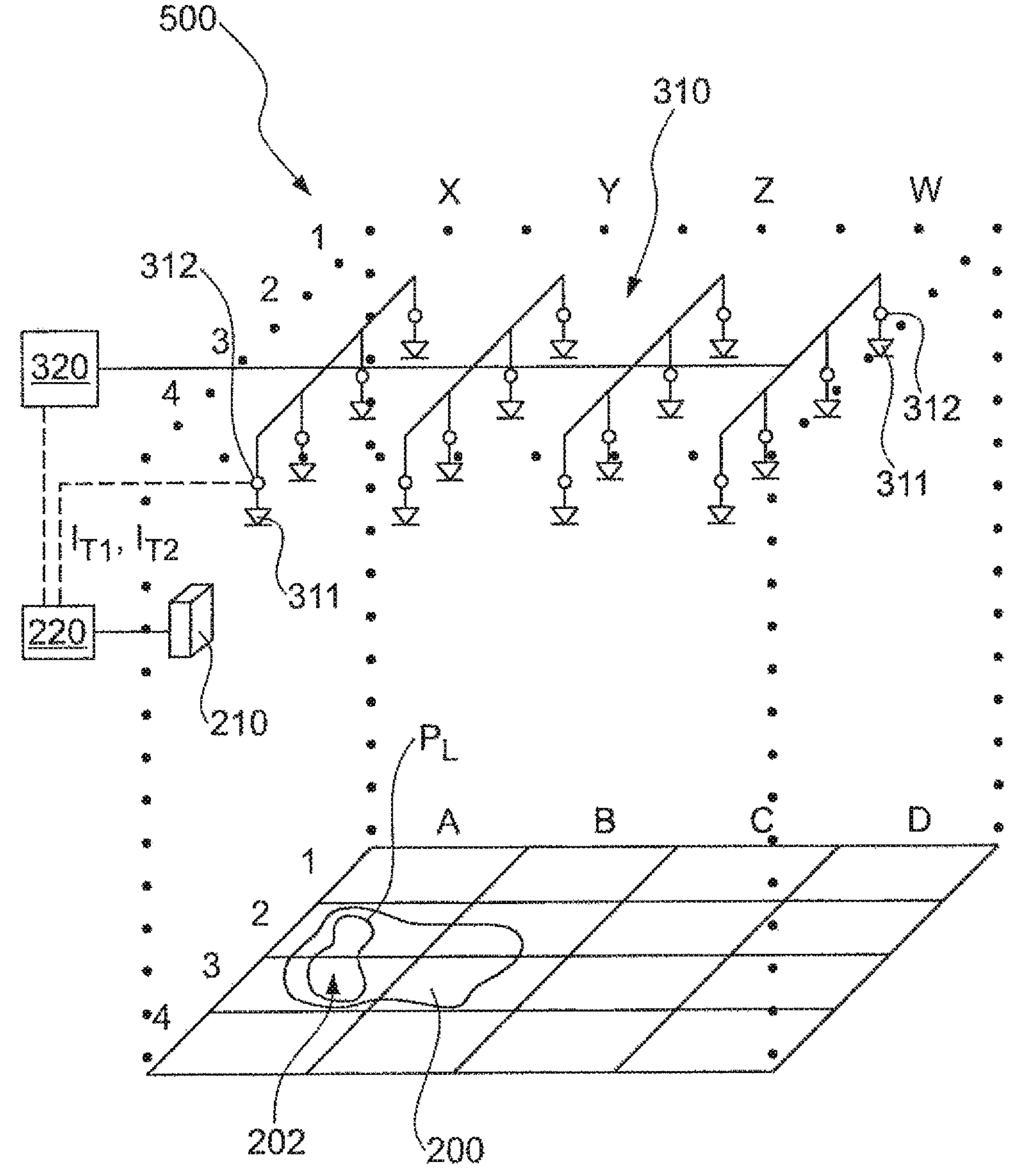
FIG. 3 shows a schematic view of a system for performing the method as per FIG. 1 in a second exemplary embodiment.

Fighting pool fires is not the only field of application of the present invention by a long way. Against this background, FIG. 3 shows a further exemplary embodiment. In this exemplary embodiment, the grid A1 to D4 should present, in exemplary fashion, the area of a disposal site of a plastic recycling facility or the like. The system 500 for fighting fire has the same functional components as the system 500 as per FIG. 2, which is why reference is made to the explanations above in respect of identical reference signs. The difference to the embodiment as per FIG. 2 lies in the fact that a stationary arrangement of a plurality of extinguishing agent outlets 311, each of which are activatable by means of a control member 312, is provided as discharge apparatus 310. By way of example, the extinguishing agent outlets are formed on nozzles of a spray water extinguishing system or a water mist extinguishing system. Each control member 312 is in signal communication with the control device 220. In a manner analogous to the procedure as per FIG. 2, the control device 220 is configured to carry out the method as per FIG. 1 and start a first extinguishing phase in which the fire event 200 is fought, in particularafter detecting a fire event 200, wherein an extinguishing agent with a first extinguishing effect is discharged from a first number of extinguishing agent outlets 311 during the first extinguishing phase. A detection device 110 monitors the fire event and its change during the first extinguishing phase. In the process, fire event parameters and the locality $P_L$ of the arising residual fire source 202 are detected. Subsequently, a control signal $I_{T2}$ for the start of a second extinguishing phase is emitted by means of the control device 220 and a second number of control members 312 for discharging extinguishing agent from a second number of extinguishing agent outlets are driven, by means of which extinguishing agent is then discharged with a second extinguishing effect at the residual fire source 202 at the locality $P_L$. The first and second extinguishing effect are chosen according to one of the above-described preferred embodiments. By way of example, the droplet size of the discharged extinguishing agent during the second extinguishing phase can differ from the droplet size of the extinguishing agent during the first extinguishing phase.

Preferably, an extinguishing agent outlet 311 is assigned to each sector A1 to D4 of the area covered by the system 500 as per FIG. 3, with the extinguishing agent outlets 311 preferably being arranged in a matrix X1 to W4 that is equivalent to the area A1 to D4. To fight the fire event 200, the extinguishing agent outlets 311 in sectors X2, Y2, X3 and Y3 are activated by the control device 220 by means of the control signal $I_{T1}$ in sectors A2, B2, A3, B3.

To fight the residual fire source 202 in a targeted fashion with a reduced use of extinguishing agent during the second extinguishing phase, the extinguishing agent outlets 311 in sectors X2, X3 are preferably activated by the electronic control device 220 by driving the corresponding control device 312.

Like in the exemplary embodiment of FIG. 2, too, it is possible for, in addition to the immediate area $A_R$ of the residual fire source 202 (cf. FIG. 2) or as an alternative to the immediate area $A_R$ of the residual fire source and its surroundings $A_U$, to be impinged with extinguishing agent by a targeted selection of the corresponding extinguishing agent outlets 311 during the second extinguishing phase.

As an alternative to the above-described selection of the “droplet size” application parameters, the amount of discharged extinguishing agent within the first and the second extinguishing phases could also be chosen to differ from one another, for example. By way of example, a water application of 30 $l/(m^2 \times min)$ could be chosen as a discharge parameter for the first extinguishing phase while a reduced water application of approximately 15 $l/(m^2 \times min)$, for example, is chosen for the second extinguishing phase.

LIST OF UTILIZED REFERENCE SIGNS

100 Method for fighting a fire event
110 Detecting a fire event
120 Starting a first extinguishing phase
130 Monitoring the fire event
140 Starting a second extinguishing phase
200 Fire event
202 Residual fire source
210 Detection device
220 Control device for fighting a fire event
300 Extinguishing apparatus
310 Discharge apparatus
311 Extinguishing agent outlet
312 Control member
320 Extinguishing agent supply device
400 Fire monitor
410 Further fire monitor
500 System for fighting a fire event
A1 . . . . D4 Sectors of an IR matrix sensor
$P_L$ Locality of the residual fire source
$A_R$ Area of the residual fire source
$A_U$ Area of the surroundings
Atot Total area of extinguishing agent application during the second extinguishing phase
$I_D$ Alignment signal
$I_{T1}$, $I_{T2}$ Control signals for starting the first/second extinguishing phase

The invention claimed is:

1. A method for fighting a fire event, comprising:

detecting a fire event within a first area by a detection device;

starting a first extinguishing phase for fighting the fire event, wherein during the first extinguishing phase a first extinguishing agent with a first extinguishing effect is discharged onto the first area by at least one fire monitor;

monitoring the fire event within the first area by the detection device or a dedicated second detection device;

detecting fire event parameters indicative of at least one residual fire source located within a second area, wherein the second area is positioned within the first area; and starting a second extinguishing phase on the basis of the detected fire event parameters, wherein during the second extinguishing phase a second extinguishing agent with a second extinguishing effect is discharged onto the residual fire source located within the second area, and wherein the second extinguishing effect differs from the first extinguishing effect.

2. The method as claimed in claim 1, wherein the first and second extinguishing phases are started by a control device, wherein the control device is in signal communication with the detection device or the dedicated second detection device, which transmits at least one of the detection of the fire event, the fire event parameters, or the results of monitoring the fire event and the first area to the control device, and the control device further controls the discharge of the first and second extinguishing agent according to need.

3. The method as claimed in claim 1, wherein the first extinguishing agent or second extinguishing agent is discharged by the at least one fire monitor, the method further comprising:

selectively releasing a flow of the first extinguishing agent or the second extinguishing agent.

4. The method as claimed in claim 2, wherein one or more of the following discharge parameters of the first extinguishing effect is different from the second extinguishing effect:

volumetric flow rate in l/min,
mass flow rate in kg/s,
amount of extinguishing agent introduced in $kg/m^3$,
amount of extinguishing agent applied in $l/(m^2 \times min)$,
droplet size or droplet size distribution, and
pressure at the at least one fire monitor.

5. The method as claimed in claim 4, wherein the first extinguishing agent with the first extinguishing effect comprises extinguishing water and is discharged by a first fire monitor, and wherein during the second extinguishing phase the control device controls the discharge of the second extinguishing agent with the second extinguishing effect using at least one of the first fire monitor or a second fire monitor.

6. The method as claimed in claim 5, wherein at least one of the first fire monitor or the second fire monitor is directed to the second area during the second extinguishing phase.

7. The method as claimed in claim 6, wherein the control device transmits an alignment signal to the first or the second fire monitor for directing an alignment to the second area.

8. The method as claimed in claim 1, wherein extinguishing water is discharged as the first extinguishing agent during the first extinguishing phase and an extinguishing agent additive or a foaming agent mixed into the extinguishing water is discharged as the second extinguishing agent during the second extinguishing phase.

9. The method as claimed in claim 1, wherein the second area of the at least one residual fire source is determined by the detection device or the dedicated second detection device using an IR array sensor or an infrared thermopile array sensor.

10. The method as claimed in claim 4, wherein the detection device transfers the results of monitoring the fire event on the basis of the detected fire event parameters to the control device, wherein, furthermore, the control device generates on the basis thereof a control signal for the start of the second extinguishing phase for the discharge of the second extinguishing agent according to need.

11. The method as claimed in claim 10, wherein the control device comprises a fire detection and/or extinguishing control panel.

12. A system for fighting a fire event comprising:

a detection device configured to detect a fire event in a first area;

a control device including a microprocessor and data memory, wherein the control device is in signal communication with the detection device and receives a signal from the detection device indicating the detection of the fire event in the first area; and at least one fire monitor configured to, based on control signals received from the control device, discharge a first extinguishing agent with a first extinguishing effect during a first extinguishing phase, wherein the detection device monitors the fire event within the first area and detects fire event parameters indicative of at least one residual fire source located within a second area that is positioned within the first area, and wherein the at least one fire monitor discharges a second extinguishing agent with a second extinguishing effect, different from the first extinguishing effect, onto the residual fire source located within the second area.

13. The system as claimed in claim 12, wherein the control device is configured to receive and process, or to store in the data memory, at least one of the fire event detected by the detection device or the results of monitoring the fire event or fire event parameters, and generate a control signal for the discharge of the second extinguishing agent according to a need during the second extinguishing phase.

14. The system as claimed in claim 12, wherein one or more discharge parameters of the second extinguishing effect and the first extinguishing effect, are selected from the following list:

volumetric flow rate in l/min,
mass flow rate in kg/s,
amount of extinguishing agent introduced in $kg/m^3$,
pressure at the at least one fire monitor,
amount of extinguishing agent applied in $l/(m^2 \times min)$, or
droplet size or droplet size distribution.

15. The system as claimed in claim 12, further comprising an unmanned vehicle, a robot or a drone, which comprises the detection device and/or the at least one fire monitor.

16. The system as claimed in claim 13, wherein the control device comprises a fire detection and/or extinguishing control panel.

17. The method as claimed in claim 5, wherein during the second extinguishing phase using the at least one of the first fire monitor or the second fire monitor, the method further comprises:

using the first fire monitor.

18. The method as claimed in claim 17, wherein the first fire monitor is directed to the second area during the second extinguishing phase.

19. The method as claimed in claim 18, wherein the control device transmits an alignment signal to the first fire monitor for directing an alignment of the first fire monitor to the second area.

20. The method as claimed in claim 17, wherein the second extinguishing agent with the second extinguishing effect comprises extinguishing water.

* * * * *